(No Model.)  5 Sheets—Sheet 1.
J. T. DAVIS.
COMBINED TYPE WRITING MACHINE AND DUPLICATOR.
No. 494,060.  Patented Mar. 21, 1893.
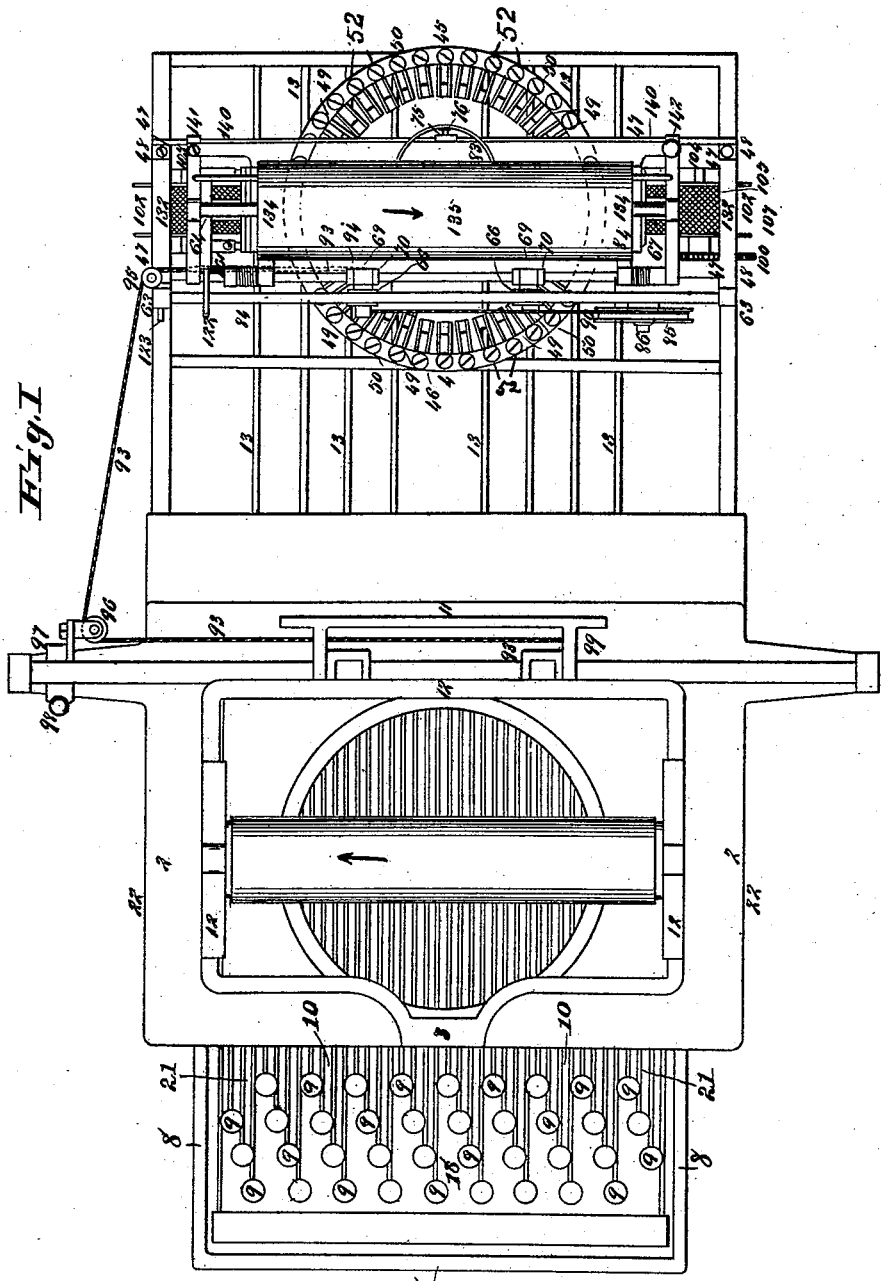
Fig. I
Fig. II
Attest:
George E. Crane.
Harry S. Rohrer
Inventor:
John T. Davis.
By Knight Bro's.
Atty's.

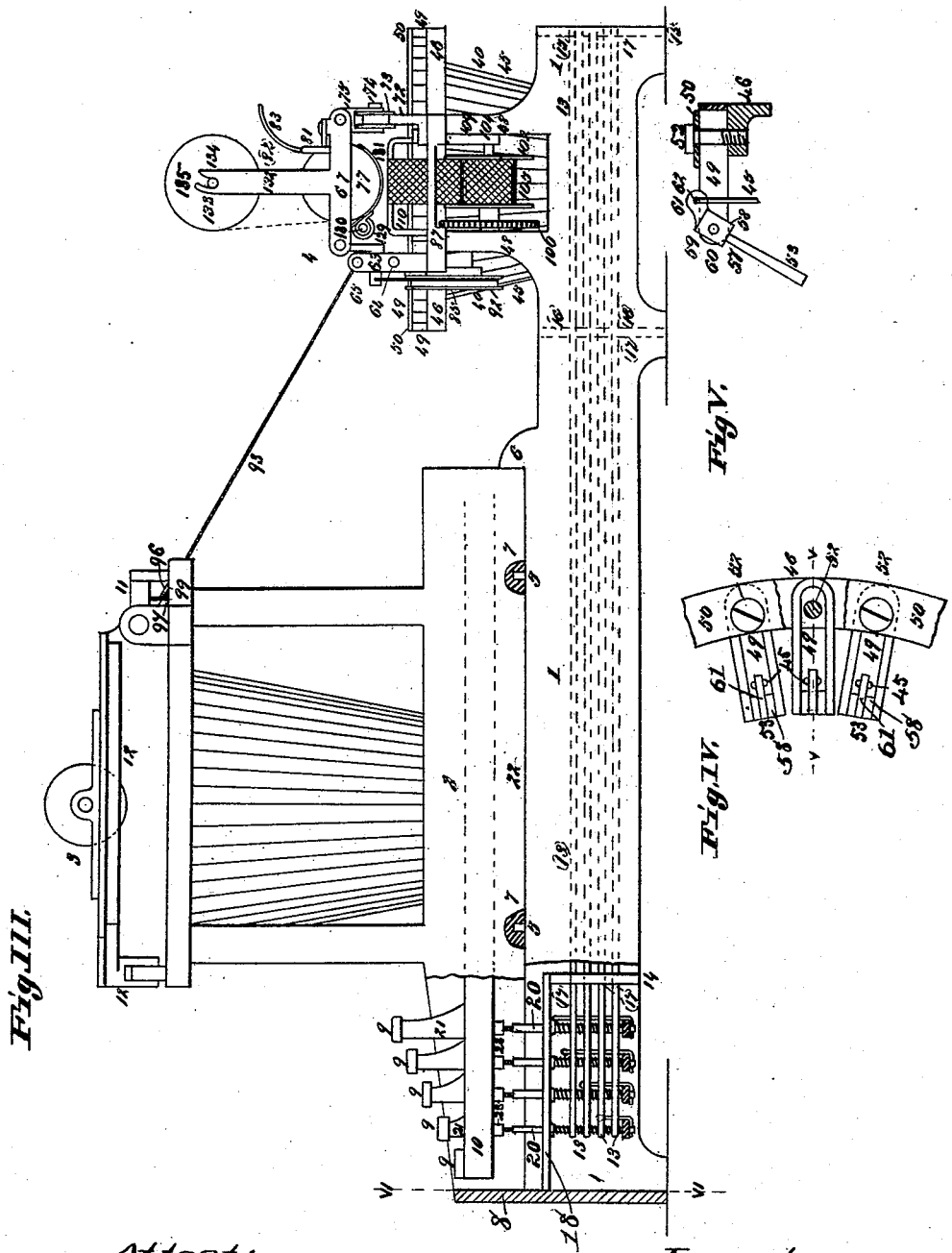

(No Model.) 5 Sheets—Sheet 3.
J. T. DAVIS.
COMBINED TYPE WRITING MACHINE AND DUPLICATOR.
No. 494,060. Patented Mar. 21, 1893.
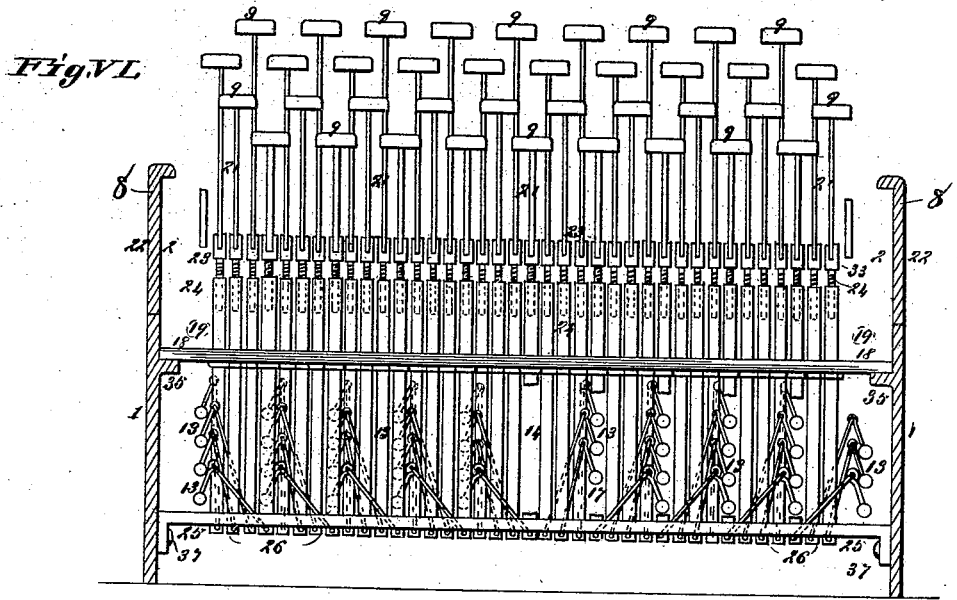
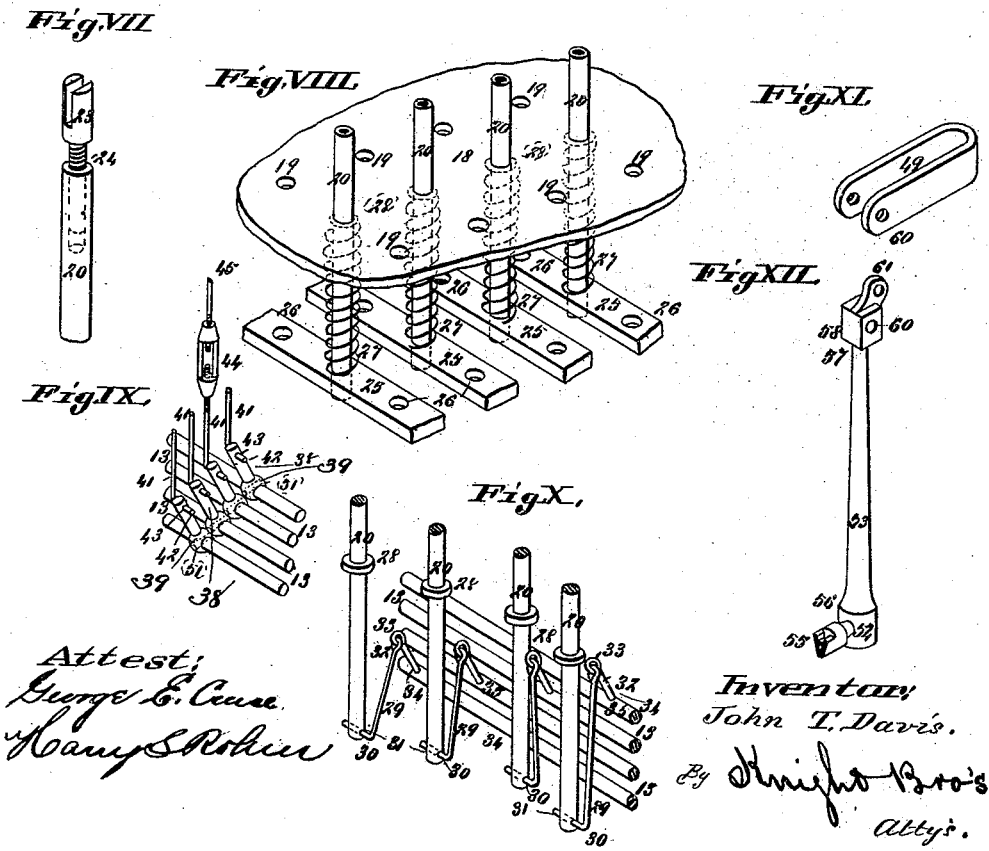
Attest:
George E. Cruse
Harry S. Rohier
Inventor,
John T. Davis.
By Knight Bro's
Atty's.

(No Model.) 5 Sheets—Sheet 4.
J. T. DAVIS.
COMBINED TYPE WRITING MACHINE AND DUPLICATOR.
No. 494,060. Patented Mar. 21, 1893.
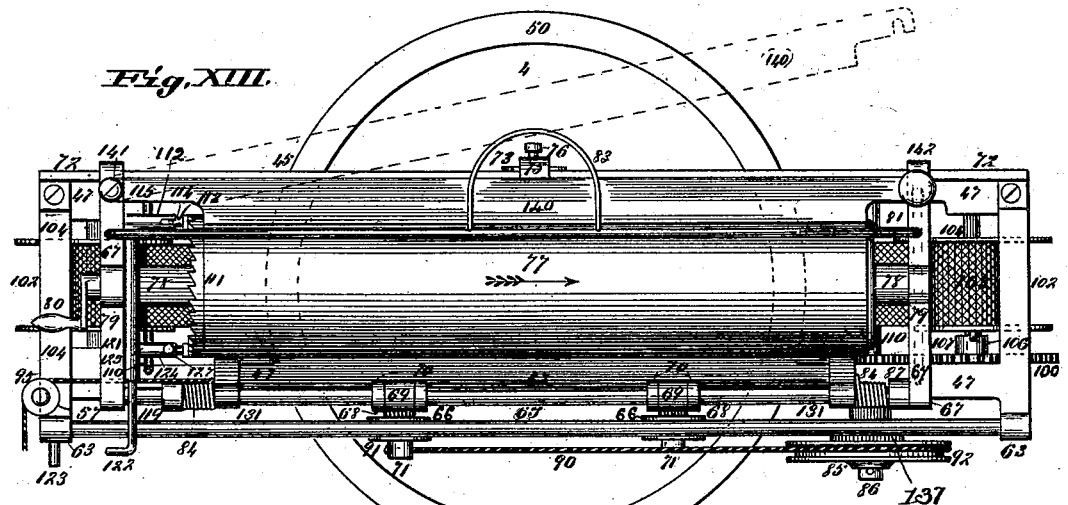
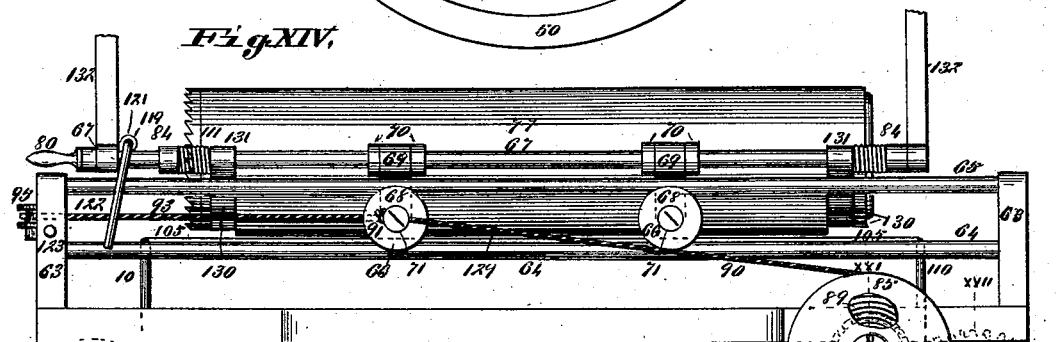
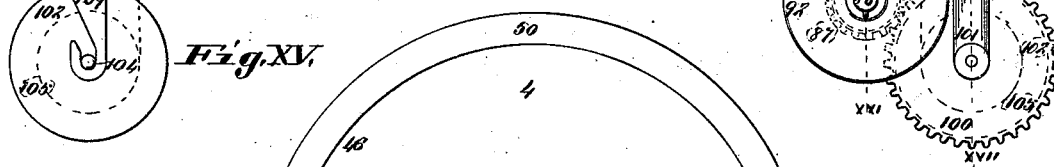
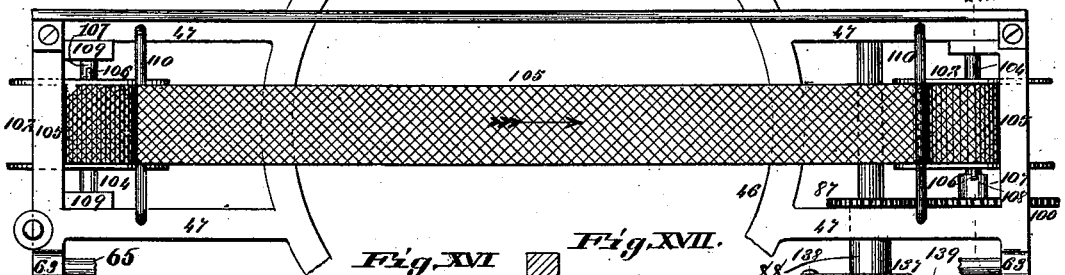
Attest:
George E. Cruse
Harry D. Rohrer
Inventor:
John T. Davis.
By Knight Bros.
Attys.

(No Model.) 5 Sheets—Sheet 5.
J. T. DAVIS.
COMBINED TYPE WRITING MACHINE AND DUPLICATOR.
No. 494,060. Patented Mar. 21, 1893.
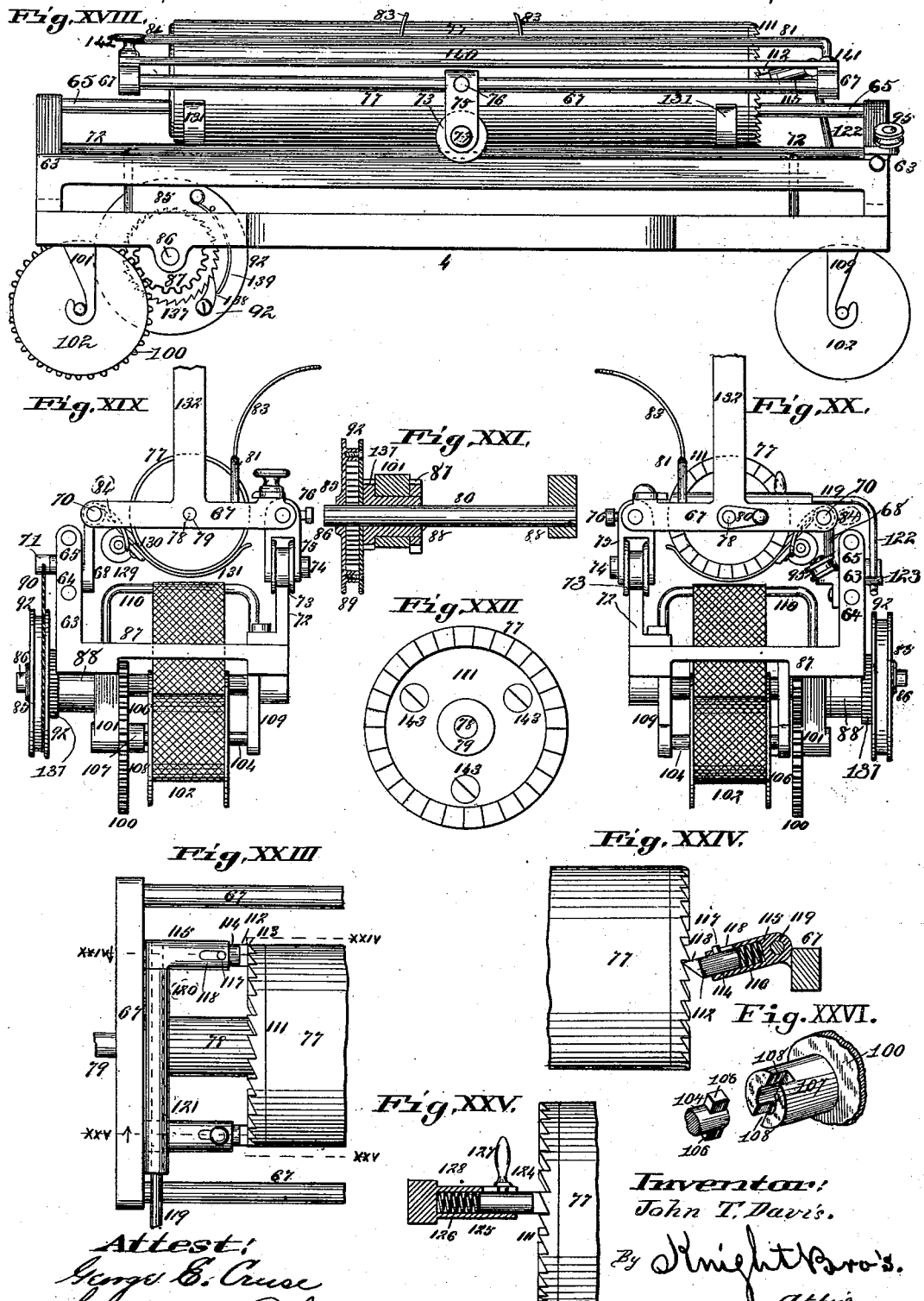

UNITED STATES PATENT OFFICE.

JOHN T. DAVIS, OF ST. LOUIS, MISSOURI, ASSIGNOR OF ONE-HALF TO CHARLES J. MOFFETT, OF SAME PLACE.

COMBINED TYPE-WRITING MACHINE AND DUPLICATOR.

SPECIFICATION forming part of Letters Patent No. 494,060, dated March 21, 1893.

Application filed January 30, 1892. Serial No. 419,773. (No model.)

*To all whom it may concern:*

Be it known that I, JOHN T. DAVIS, of the city of St. Louis, in the State of Missouri, have invented a certain new and useful Improvement in a Combined Type-Writing Machine and Duplicator, of which the following is a full, clear, and exact description, reference being had to the accompanying drawings, forming part of this specification.

This invention relates to a duplex apparatus, that transmits the movements from a type-writer to a repeater, or duplicator machine, which duplicator machine is so constructed as to make an exact transcript or a plurality of transcripts of the type writing work of the initial or original machine; and the invention consists in features of novelty hereinafter fully described and pointed out in the claims.

Figure I is a top view, and shows both the initial and duplicating type writers, with the pulley cord attachment from the carriage of the former to that of the latter, to effect the simultaneous spacing of the type, of the latter to that of the former. Fig. II is a perspective view of the clamp sleeve. Fig. III is a side elevation, with part broken away to show the stay pins that secure the initial type writer to the transmitter base frame. Fig. IV is an enlarged, detail view of the type bar circle with part of the top cap broken away, and shows the fulcrum of the type bars. Fig. V is an enlarged, vertical section, taken on line V—V, Fig. IV, and shows the fulcrum action of the type bars. Fig. VI is a vertical, transverse section, taken on line VI—VI, Fig. III, and shows the crank arm connection of the tappet push-rods, that transmit action from the keys to the rock-shafts that work the duplicator type. Fig. VII is an enlarged, detail perspective view of one of the tappet-push rods, or duplicator keys. Fig. VIII is an enlarged, detail, perspective view, showing the push rods, guide-plate, guide-bars and the reactionary springs. Fig. IX is an enlarged, detail, perspective view of the rear connection between the rock-shaft and the type bars of the duplicator machine. Fig. X is an enlarged, detail, perspective view of the front connection of the push-rods to the rock-shafts. Fig. XI is an enlarged, perspective view of the U shaped type bar fulcrum. Fig. XII is an enlarged, perspective view of the type bar, of the duplicator machine with type mounted thereon, and shows the heavy tappet end of said bar that adds to the momentum of the stroke. Fig. XIII is an enlarged, plan view of the duplicating carriage, and shows the pawl and ratchet automatic line spacer. Fig. XIV is an enlarged, front elevation of the same. Fig. XV is an enlarged plan view of the rear end of the duplicating carriage supporting frame, and shows the ribbon reels with the ribbon mounted thereon. Fig. XVI is a vertical, transverse section taken on line XVI—XVI, Fig. XVII, showing the spool with the slot in the shaft for holding the ribbon. Fig. XVII is an enlarged, vertical section, taken on line XVII—XVII, Fig. XIV, and shows the ribbon spool on its mount. Fig. XVIII is an enlarged, rear elevation of the duplicating carriage. Fig. XIX is an enlarged end view of the right hand end of the duplicating carriage, and the supporting frame. Fig. XX is a like view of the left hand end of said duplicating carriage and supporting frame. Fig. XXI is an enlarged, vertical, transverse section, taken on line XXI—XXI, Fig. XIV, showing the spring drum, and the spool shaft. Fig. XXII is an enlarged, detail end view of the printing roll. Fig. XXIII is an enlarged, plan view of the printing roll and frame. Fig. XXIV is an enlarged, vertical section, taken on the staggered line XXIV—XXIV, Fig. XXIII, looking in the direction indicated by the arrow showing the line spacer dog, and rack on the printing roller that said dog controls. Fig. XXV is an enlarged, vertical section, taken on line XXV—XXV, Fig. XXIII, showing the stop dog and rack. Fig. XXVI is a perspective view showing the connection between the hubs of the ribbon-spool and rack-wheel disconnected.

Referring to the drawings:—1 represents the base or transmitter frame on the front portion of which is seated the bed frame 2 of the initial or primary type writer 3, which type writer may be of any suitable construction. The said initial type-writer acts as the leader to the duplicating devices, which constitute prominent elements in this invention, and by novel transmitting devices hereinafter described the manipulative action of the operator on said initial leader machine, simultaneously operates the type of my combined duplicator and manifolder 4. The said initial type writer is secured from displacement by the surmounting stay-pins 5 and the buffer lugs 6, which project upward from said transmitter base frame 1, and said stay-pins are inserted in pin holes 7 in the side pieces 22 of said bed frame 2 of the initial type-writer, and the lugs 6 act as buffer stays, to still further prevent the tension draw creeping of said machine, consequent on its pulley cord attachment to my duplicator machine. The said initial typewriter being, as stated, of any suitable construction, and my invention being adapted for use in combination with any ordinary type-writer, only such parts of said initial type-writer need be herein shown, described and indicated, that have necessary connection with my duplicating and manifolding type writer, and with the transmission of the movements of said initial leader machine to said duplicator.

8 represents the key-table of said initial type-writer, 9 are its keys, 10 its pivoted key levers and 11 the escapement bar of its carriage 12.

13 represent the rock-shaft transmitters that simultaneously with the action of the initial machine transmit said action to my duplicating manifolder 4.

14 is the forward, 15 the rear, and 16 the intermediate bearer plate, in the perforate bearings 17 of which the said rock-shaft transmitters 13 are seated and rock in their transmitter action.

18 represents my perforate guide plate or duplicator key-table, that rests on the lugs 35, that project inwardly from the sides of the transmitter frame, beneath the key-table of the initial machine, through the perforations 19 in which duplicator key-table, the pitman transmitter rods, or duplicator key rods 20 work and are guided, the said duplicator key rods, being connected to the usual pitman key bars 21 of the type-keys 9, by the bifurcated pitman joint screws 23, which are screw seated at 24 in the upper ends of said duplicator key rods 20. The said pitman joint screws 23 are made adjustable by means of their elongated screw connection with the duplicator pitman key rods 20, so as to adjust the connection of the pitman key rods of the initial machine to the duplicator pitman key rods.

25 represents guide bars, secured to the aforesaid transmitter frame, near its base by screw-bolts or rivets 37, near the feet of said duplicator pitman key rods 20, in the perforations 26 in which guide bars, said key-rods are seated and work. 27 represent reactionary, spiral springs, which are seated around said key rods, between said perforate duplicator table 18 and said guide bars 25, said springs being confined at top by the collars 28 that are rigidly mounted on said key-rods 20, and said springs pressing at bottom against said guide bars 25, to enforce the return of said key rods, and their surmounting keys to their normal positions after their tappet action. The said collars 28, when they come in contact with the guide plate 18, prevent the undue abnormal elevation of the keys. 29 represents connecting rods, whose lower hooked ends 30 are seated in the perforations 31 at the feet of said key-rods 20, and their eyelet upper ends 32 engage in the eyelets 33, of the rocker rods 34, which latter are screwed, riveted or otherwise secured in the perforate seats 35 in the aforesaid rock-shaft transmitters 13. The said transmitter rock-shafts extend from near the front of the transmitter frame and under the initial typewriter, clear back to the rear of said frame beneath my combined duplicator and manifolder type writer 4; the said elongated transmitter rock shafts, working as stated in their three bearings in the perforate plates 14, 15 and 16, have thus provided for said shafts in accurate alignments, steady rock bearings all along their lines.

38 represents rocker rods, whose boss sleeve ends 39 embrace the transmitter rocker shaft, in adjusted positions, beneath the type basket 40 of my duplicator and manifolder, and 51 are rivets that pass through perforations in said boss sleeves, and rock shafts and thus secure said rocker rods in their rightly adjusted positions for the work they have to perform.

I have shown and described the rocker bars 34 (that are driven by my transmitting devices from the initial type writer to rock the transmitter shafts) as inserted in said rock shaft and the rocker rods 38, that at the other end of the transmitter shafts are rocked thereby as having a sleeve embrace, and riveted hold, of said rocker shaft, but the rocker rods 34 and 38 may both or either be inserted into the rocker shaft as the rod 34 is shown in Fig. X or both or either may be made to embrace said rock shaft and be riveted thereto as the rod 38 is shown in Fig. IX, either attachment being substantially the same as the other, but the first named may be preferred in light work and the latter in heavy work, especially in offices where a large amount of manifolding is required to be done.

41 represents connecting rods, whose hook ends 42 engage in the perforate ends 43 of the rocker rods 38. The upper screw ends of said rods 41 engage in the lower ends of the right and left hand coupling screw links or turnbuckles 44; the upper screws of which links or turnbuckles engage with the foot screws of the pitman rods 45, that operate the type levers of the duplicator.

46 represents the circle bar which constitutes the rim of the type basket 40, the supporting frame 47 of which type basket is secured to the pedestal arms 48, that surmount the rear end of the transmitter frame 1.

49 represents the U shaped type bar fulcrums, whose bow ends rest on the circle bar, and are there held by the surmounting perforate ring-plate 50, which ring plate is itself held and holds said U shaped fulcrums in position by means of the screws 52, which pass through the perforations in said ring-plate, through the bow ends of the U shaped fulcrums and are screw seated in the circle-bar 46 of said type basket 40.

53 represents my type fulcrum lever, in that the type bearer end 54, which carries the type 55 on the type stud 56, is enlarged to increase the momentum of the blow which enforces the impression of the type, and the fulcrum or shank end 57 of said type lever is for the same reason reduced in diameter, so as to secure a weighted type-bar which has a live responsive spring action that aids instead of reducing the effect of the impression and quickens the reaction of said type lever, so as both to make a more clearly defined impression of the type, and to largely increase the number of manifold copies that can be produced. The said manifold copies are taken simultaneously with the original, of the ordinary leader type writer, and with the duplicate of my secondary machine. 58 represents the hub blocks of said type fulcrum levers, which are freely mounted within the duplex bars of the U shaped fulcrums and 59 are the fulcrum rivets or bolts that pass through their perforate bearings 60 in said U shaped fulcrums, and in said hub blocks. In the perforate angle lugs 61 of said type fulcrum levers, the attachment hooks 62 of the aforesaid pendent pitman rods 45 are seated.

Now it will be seen by the drawings, and by the above description of the leader transmitting devices, that by each action of the tapped keys of the initial type writer 3, (which type writer constitutes a leader) not only do said tapped keys effect the usual work of said type writers, but they also do by herein shown and above described transmitter devices, simultaneously work the fulcrum lever of my duplicator and manifolder. Two surmounting track carrier pedestals 63 rise from the inner side of the supporting frame, and in said pedestals are mounted the ends of the lower round inner track rail 64, and the surmounting round inner rail 65, between which rails the flanged front wheels 66 run, of the rectangular framed printing roller carriage 67. Hanger wheel carriers 68 hang pendent by their hinged connections 69 from the front bar of said carriage between the integral collars 70 on said bar, and the screw tips of the journal bolts 71 on which said front wheels are mounted are seated and held in said pendent hinge mounted hangers 68. 72 represents the single, rear track rail on which said carriage is mounted, and on which runs the flanged rear wheel 73, which wheel runs on the journal bolt 74, which bolt is mounted in the journal bearer hanger 75, the said hanger being rigidly secured by the set screw 76 to the middle of the rear bar of the rectangular frame of said carriage 67.

77 represents the printing roller, which is mounted on the shaft 78, whose journals run in bearings 79 in the ends of the carriage frame, and 80 is a crank handle mounted on the extension end of one of said journals beyond its bearings, which crank provides the means for turning said printing roller by hand when required.

81 represents the guide bar, for guiding and holding the transcript paper 82 to the roller. The ends of said guide-bar are secured to the rear of the carriage frame, and said horizontal guide-bar runs parallel to and in close proximity to said printing roller.

83 represents a combined sheet-supporter, guide, and hand bow, whose ends are secured in said guide rod. The said bow supports the surmounting end of the transcript sheet when detached sheets are used, or when the paper is detached from the roll. Secondly, it serves as a preparatory guide when inserting said sheet between the guide rod and the printing roller. Thirdly, it constitutes a convenient handle by which the printing roller and its carriage are elevated on the hinged connection 69 of the hangers 68 for examining the work. 84 represents spiral springs that are mounted on the same inner bar 65 of the carriage that is mounted in said hinges and which springs hold the feed roller in pressure against the printing roller.

85 represents a spring peripherally flanged drum, which is mounted on the axle shaft 86, which axle also carries the drive pinion wheel 87, the said pinion always turning simultaneously with said drum. The said shaft, with its pinion sleeve, works in the bracket bearings 88. On said shaft, between said drum and drive pinion is also fast mounted a ratchet wheel 137, in which engages a follower dog 138 that is attached to said drum 85 and engages with the teeth of said ratchet and a spring 139 holds said dog to its work. 89 represents a coil spring, which is anchored within said drum, and 90 is a draw chain or cord that passes through the head of the journal bolt 71 of one of the inner wheels, where said cord is secured by the knot 91. The winding end of said cord is secured to said drum within its peripheral flanges 92. The tension of the coil spring within the drum draws the carriage to its extreme right hand limit.

93 represents a chain or cord which is secured at 94 to the print roller carriage 67, of my duplicating machine, and which cord passes around the flanged pulley 95, which pulley is mounted on the left hand side supporting frame of the duplicator, and said cord passes on around a second flanged pulley 96 which pulley is secured by the clamp sleeve 97 and its set screw 98 to the frame of the initial type writer, and said cord still passing on has a secure moorage 99 to the escapement bar or any other suitable part of said initial type writer carriage. Now, it will be seen that when the carriage of the initial type writer is in its position to commence writing, the cord being adjusted to the right length, the carriage of the initial machine is as usual at its extreme right limit, and as the transcript sheet passes on the under side of its printing roller, it prints from left to right as the sheet reads. At the same time, the duplicator carriage is in the reversed position to that of the other carriage, and is to its extreme left. The transcript paper, like that of the initial machine, passes on the under side of the printing roller, so that (speaking of both machines as fronting the same way), the duplicator prints in the reverse direction, namely, from right to left, but when said duplicator sheet is turned round to face alike with that of the initial machine (which also prints on the under side of the roller) the written sheet then reads as does the other, from left to right. As the carriage of the initial type-writer is by the ordinary means made to travel as it writes from right to left and thus spaces the impression of its type, it releases the cord 93, and by said above described means, the chain or cord 90 is enabled under the impulse of the spring 89 to draw the carriage of the duplicator from left to right, and as at the same time by means of the transmitter devices already described, the tappet of the initial type writer keys, simultaneously works the fulcrum type levers of the duplicator as it works those of the leader machine, both the writing and spacing are simultaneously effected. It will also be seen that when the initial or leader type writer is run back, preparatory to writing another line, the said action of the leader machine draws the cord 93, and thus thereby draws the duplicator carriage to its normal position, also ready for writing another line, and at the same time by means of the cord 90 winds the coil spring 89.

100 represents a vertical rack wheel which is mounted on the journal bearing hanger 101, and said rack wheel being engaged by the aforesaid drive pinion 87, on the spring drum shaft 86, the said rack wheel that governs the ribbon reels is always driven while spacing. When the machines are run back preparatory to writing other lines, the dog 138 on the rack 137 on said spring drum or its shaft slips cogs.

102 represents the two ink ribbon spools, slots 103 in whose spindles 104, form clamp seats for the insertion and retention of the ink ribbon 105.

Immediately outside of one of the disks of each spool on the spindles that carry them are projecting wings 106, and when said spool is mounted on the right hand, which is the drive end of said ribbon mount in my duplicator machine, the projecting end of the reel spindle that is provided with said wings enters the countersink recess in the hub 107 of the rack wheel 100, and the projecting wings 106 are seated in slots 108 in said hub, so as to make said spindle and ribbon reel rotate with said rack wheel under the impulse of the coil spring 89. The other end of said reel spindle has its bearing in the journal bearing hanger 109. The reel at the other end of the duplicator machine, is mounted in the two journal duplicate bearing hangers 109 also at that end of the machine. 110 are elevating scaffold bars that hold the ribbon in close proximity to the transcript sheet and printing roller. Thus it will be seen that as the duplicating machine writes and spaces simultaneously with the initial machine that leads it, by its above described transmitter means, the drive pinion rack gear under the impulse of the coil spring 89 winds up the ink ribbon on the reel at the right hand end of my duplicator machine at the same gradual rate as does its leader, the initial machine winds its own ribbon. When the said r'g't hand reel is filled and the left hand one is consequently empty, the reels are simply dismounted and reversed in position.

111 represents a metal ratchet disk which is secured by screws 143 to the left hand end of my duplicator printing roller 77. The ratchet teeth project laterally from the face of said disk, from near the periphery of the same, and 112 is a spring spacing foot dog, whose bevel toe 113 engages with said ratchet when operated. The heel end 114 of said foot dog is seated within the sleeve holder 115, in which sleeve it is backed by the spiral spring 116, and said toe can be disengaged from the rack by drawing back on the pin 117 that projects from the heel of said dog through the slot 118 in the sleeve in which it is seated.

119 represents a crank rock-shaft one end of which is fast mounted in the rear end of the sleeve holder 115, from which the spring dog projects. The said rock-shaft has a loose bearing 120 in the sleeve bearing box 121, which is secured to the left end piece of the duplicator carriage 67. After passing through said sleeve the said rock shaft is bent downward at about a right angle in front of said carriage, making the crank arm 122, and when said carriage has pulled the cord 93, to the extent of its draw and consequently the line written on the transcript sheet has been completed, the initial machine, which has reached the limit of its stroke in returning to its normal position pulls the cord 93, which in turn returns my duplicator carriage to its normal position and in so doing the said pendent crank arm comes in contact with the trip pin 123, which rocks said shaft and the spacing foot dog 112, whose toe engaging with the ratchet 111 turns the printing roller a distance equivalent to the interspace between the lines on the transcript sheet. Thus is automatically effected the line spacing without the movement of a hand on the part of the operator other than the usual manipulation of the keys, and customary movements of the initial type-writer. When the said initial typewriter carriage is run back for a fresh line service, the said action draws the cord 93, and thereby draws the duplicator carriage back to its normal position, and coils the coil spring 89. Now, as the primary or initial machine is operated in writing a fresh or new line, the cord 93 becomes loosened under each tap of the type, and the coil spring 89 of my duplicator in unwinding or uncoiling pulls the cord 90 and thereby moves my duplicator carriage at the same or at an equal distance as the initial machine.

124 represents a spring stop dog, whose bevel toe engages between the teeth of said ratchet disk 111, and its heel is seated in the sleeve holder 125, which holder is secured to the left hand end piece of the duplicator carriage frame. The spiral spring 126 in said sleeve holder, pushes said dog to its work. A hand pin 127 which projects from the heel of said bolt through the slot 128, is used when it is desired to unhitch the dog from its ratchet seat by hand. Now it will be seen that when the crank arm 122 of the rock shaft 119 is enforced by the trip-pin 123 to rock the spacing dog 112, and thus turn the printing roller an interline spacing distance, the bevel toe face of the stop dog 124, rides over the inclined ratchet to that extent, pushing back on the spiral spring 126 to enable it so to do (thus not obstructing the action of the spacing dog), but immediately that the spacing dog has effected its work said stop dog springs forward into its new seat and securely holds the printing roller from turning.

129 represents the feed roller of the duplicator machine whose journal boxes 130 are mounted and secured on the spring guide bars 131, that guide and press the paper around the printing roll and the attachment end of which guide bars loop around the front bar of the duplicator carriage frame 67. The aforesaid spiral springs 84 that are also mounted on said front bar of said carriage exert tension on said guide bars and feed roller.

132 represent surmounting pedestals, that rise vertically from the middle of the end pieces of the duplicator carriage 67, the tops of which pedestals are provided with slotted bearings 133 in which the journals of the shaft 134 are mounted. On said shaft is mounted the paper roll 135, on the unrolled or transcript paper 82 of which the duplicator transcript is made. When it is desired to manifold as well as duplicate the paper roll can be put up with as many plies or layers as it is required to make copies, with intervening carbon sheets for producing the manifold copies.

140 represents a knife with a cutting edge the length of the printing roller. The said knife is secured to one of the end pieces of the duplicator carriage 67, at the rear side thereof, by the pivot screw 141, and the other end is secured when in cutting position by the set screw 142. It will be seen that the said knife is in a convenient position for severing the transcribed sheets from the paper roll.

A diversity of paper rolls may be used, some of which may be spaced by letter heads and some may be bill headed or with any other required heads, and others blank; the journal shaft of the paper roll which at the time being is required being mounted on the pedestals 132. Also separate sheets can be used in the place of the roll, when it is so required.

I have shown and described one of my combined duplicator and manifolder machines in combination with and simultaneously led by the initial machine, but I do not confine myself to a single duplicator machine, for it is evident that by the extension rearward of my transmitter frame and rock-shafts with their rocking attachments, other additional duplicator machines may be attached, and their spacing devices, will be alike governed by additional cords that unite them to the control of the duplicator frame of the machine next in front thereof, as the first duplicator follows the lead of the initial machine in its spacing operation. Where there are additional duplicators, the respective front and rear positions of the transcript sheets or roll paper as regards the printer roll, should always be reverse of that of the leader, because the movement of the carriage is reversed, so as to make the duplicate sheets exact counterparts, with the writing in all cases as usual from left to right of the sheets.

Signal advantage is found from the weighted toe end and flexible spring heel of my fulcrum type lever, as from the increased momentum of the former and lively spring action and reaction of the latter, a much more distinct, clearly defined impression of the type is effected on the original sheet of the duplicator, and consequently also a much larger number of manifold copies can be legibly written when required.

One of the principal objects of this invention is to multiply results in the work of a single operator, where as is frequently the case, a large number of duplicate and manifold copies are required, and also to produce an indelible and durable ribbon duplicate copy, for filing and other uses.

I claim as my invention—

1. In a combined type writer and duplicator, the combination of the initial leader type writer, the duplicating type writer, the fulcrum type-lever, having a weighted type-bearing end to increase the momentum of the type stroke and the rock-shafts and their transmitter attachments, that transmit simultaneous co-operative action from the keys of said leader machine on the type levers of both machines; substantially as described.

2. In a combined type writer and duplicator, the combination of the transmitter case, the initial leader type writer, the duplicator type writer, the fulcrum type-lever having a light spring shank end to provide elasticity to its type stroke and the transmitter rock-shafts with their rock-levers, that transmit action from the pitman keys of said leader machine to said duplicator; substantially as described.

3. In a combined type writer and duplicator, the combination of the initial leader type writer, the duplicator type writer, the flanged pulleys 95 and 96 and the cord 93 that works on said pulleys and connects the carriages of said machines the transmitter rock-shafts, and the initial and secondary rock levers and attachments that transmit action from the pitman keys of said leader machine to the type lever of the duplicator, and said type lever having a heavy type bearer end and light elastic spring shank end; substantially as described.

4. In a combined type writer and duplicator, the combination of the initial leader type writer, the duplicator type writer, the transmitter rock-shafts 13, the perforate plates in which said rock-shafts have their rock-bearings, the keys 9 that simultaneously work the combined machines, the pivoted key arms 10, the pitman transmitter rods or duplicator keys 20, the said keys having the bifurcated adjustable pitman screw heads 23 the perforate guide plate or duplicator key table 18, in which said duplicator transmitter keys work, the initial and secondary rock levers, that rock and are rocked by said rock shaft, and the pitman rods that connect said rocked levers to the fulcrum type levers that impress the type of the duplicator machine; substantially as described.

5. In a combined type-writer and duplicator, the combination of the initial leader type-writer, the duplicator, the keys 9 that simultaneously work the combined machines, the bifurcated joint screws 23, the pitman transmitter rods or duplicator keys 20, worked by said initial keys 9, the perforate guide plate or duplicator key table 18, the guide bars 25, the reactionary spiral springs 27, that return the initial and duplicator keys to their normal positions, the transmitter rock-shaft 13, the rock levers, that rock said shaft, and those that are rocked by it, and the pitman rods that connect the latter with the type lever of the duplicator; substantially as described.

6. In a combined type-writer and duplicator, the combination of the initial leader type-writer, the duplicator, said duplicator having the printer carriage 67, the clamp sleeve 97, the set screw that secures said clamp sleeve to said leader machine, the pulley 96 carried by said clamp sleeve and the chain or cord 93, that by release secures simultaneous letter space action with the duplicator to that of the initial machine; substantially as described.

7. In a combined type writer and duplicator, the combination of the initial leader type writer, the duplicator, said duplicator having the carriage 67, controlled by the cords 93 and 90 under the impulse of the carriage of the initial type-writer and of the coil spring 89 the flanged drum 85, the axle 86 on which said drum is mounted, the coil spring 89 in said drum, and the draw cord 90, secured to said drum and to said carriage said cord under the impulse of said spring, letter spacing in the duplicator simultaneously with that of said leader machine; substantially as described.

8. In a combined type writer and duplicator, the combination with the initial leader type-writer, of the duplicator and manifolder 4, having the carriage 67, and the printing roller 77, the ratchet disk 111 secured to one end of said printing roller, the chain or cord 93 that connects the carriage of said leader machine to the carriage of the duplicator, and effects the return of the duplicator carriage simultaneously with the carriage of the leader machine, preparatory to writing another line, the spacing dog 112 that engages in said ratchet disk 111, the crank rock-shaft 119, the crank arm 122 on said rock-shaft, and the trip pin 123; substantially as described.

9. In a combined type-writer and duplicator, the combination with the initial leader type-writer, of the duplicator and manifolder 4, having the carriage 67, the printing roller 77, and the ratchet disk 111 on said roller, the chain or cord 93, the automatically operated line spacing dog 112, and the stop dog 124; substantially as described.

10. In a combined type-writer and duplicator, the combination with the initial leader type-writer, of the duplicator and manifolder carriage 67, the cord 93 that connects said carriage to the initial carriage, the coil spring 89, the cord 90, that connects said duplicator carriage to said coil spring the front wheels of said carriage and the duplex rails between which said wheels run, the rear wheel of said carriage and the single rail on which said wheel runs; substantially as described.

11. In a combined type-writer and duplicator, the combination with the initial leader type-writer, of the duplicator and manifolder carriage, the spring drum 85, the coil spring 89 in said drum, the chain or cord 90 that connects said drum to said carriage, the shaft on which said drum is mounted, the drive pinion mounted on said shaft, the rack wheel 100, the hub 107, and its journal shaft that carries said rack wheel, the journal bearing hanger on which said rack wheel is mounted, the duplex reels 102, the slotted spindles on which said reels are mounted, the projecting wings 106 on said spindles, which wings engage in recesses in said hub, the hangers 109 on which said reels are mounted, and the ink ribbon 105 mounted on said reels; substantially as described.

12. In a combined type writer and duplicator, the combination of the initial leader type writer, the duplicator and manifolder carriage, the spring drum 85, the chain or cord 90 that connects said drum to said carriage, the shaft 86 on which said drum is mounted, the drive-pinion 87 mounted on said shaft, the ratchet wheel 137, the follower dog 138, the spring 139, the rack wheel 100 with which said drive pinion engages, and the ink ribbon reels 102 run by said rack wheel; substantially as described.

13. In a combined type-writer and duplicator, the combination of the initial leader typewriter, the duplicator and manifolder carriage, the printing roller mounted on said carriage, the feed roller 129, the spring guide bars 131, the guide bar 81, the guide and hand bow 83, the spiral springs 84, the cords 93 that connect the carriage of the initial type writer to that of the duplicator, the spring drum 85, the chain or cord 90 that connects said spring drum to said carriage, of the duplicator, the ratchet disk 111 secured to said printing roller, the spacing dog 112 that operates on said ratchet, the crank rock shaft 119 that operates said dog and the trip pin 123 that automatically trips said crank shaft; substantially as described.

14. In a combined type-writer and duplicator, the combination of the initial leader typewriter, the duplicator and manifolder carriage 67, the chain or cord 93 that connects said carriage of said initial machine to that of said duplicator, the pedestals 132 that surmount the carriage of the duplicator, and the paper roll 135, mounted on said pedestals; substantially as described.

15. In a combined type-writer and duplicator, the combination of the initial leader typewriter, the duplicator carriage 67, the printing roller mounted on said carriage, the chain or cord 93 that connects said carriage to the carriage of said leader type writer, the ratchet disk on said printing roller, the automatically tripped line spacing dog 112, the pedestals 132, the paper roll on said pedestals, the pivoted knife 140, and the set screw 142, that secures said knife in its working position; substantially as described.

16. In a combined type-writer and duplicator, the combination of the initial leader typewriter, the duplicator carriage, the chain or cord 93 that connects the carriage of said leader machine to that of said duplicator, the printing roller 77 mounted on said duplicator carriage, the ratchet disk 111 secured to said roller, the automatically worked line spacing dog 112 mounted on said carriage and that line spaces said roller, the stop dog 124, the spiral springs 116 and 126 that respectively push said line spacing and stop dogs, the crank handle 80, on the printing roller shaft and the hand pins 117 and 127 that are mounted in said dogs; substantially as described.

17. In a combined type-writer and duplicator, the combination of the initial leader type writer, the duplicator carriage, the printing roller mounted on said carriage, the chain or cord that connects said duplicator carriage to the carriage of said leader machine, the duplicator circle bar 46, the U shaped type bar fulcrums that are seated on said circle bar, the ring plate 50 that surmounts said fulcrums, the screws 52 that secure said ring plate and fulcrums to their seats, the fulcrum type lever having a weighted type carrier end and elastic shank; said lever pivoted in said U shaped fulcrums 49; substantially as described.

18. In a combined type-writer and duplicator, the combination of the initial leader type-writer, the duplicator type basket frame, the transmitter rock-shafts 13, the duplicator keys or transmitter rods 20, the rock levers that connect said vertical transmitter rods to said horizontal transmitter rock shafts, the rock levers that said rock-shafts drive, the circle bar that forms the surmounting rim of said type basket, the U shaped fulcrums, the fulcrum type levers having weighted type bearer ends and elastic shank ends, and the pitman rods that connect said driven rock levers of the transmitter shafts to said type levers; substantially as described.

19. In a combined type-writer and duplicator, a fulcrum type lever, having a bulge head at its type bearer end, and having a light, elastic shank end near its fulcrum bearings; substantially as described.

20. In a combined type-writer and duplicator, the combination of the carriage of the leader machine, the carriage of the duplicator, the alternating drag and releasing cord 93 that connects said carriages the pulleys 95 and 96 on which said cord runs the drum 85 on said duplicator carriage, the coil spring in said drum; the cord 90 secured to said drum and to said carriage of the duplicator, the printing roller mounted on said carriage, the ratchet disk 111 secured to one end of said roller, the spacing dog 112 that engages in said ratchet disk, the crank rock shaft 119, and the trip pin 123 that automatically trips said crank arm to dog said ratchet of said printing roller to interspace between lines; substantially as described.

21. In a combined type-writer and duplicator, the combination of the carriage 12 the carriage 67, the alternating draft and releasing cord 93 that connects said carriages, the pulleys 95 and 96 on which said cord runs the pedestals that surmount said carriage 67 the paper roll mounted on said pedestals; the knife 140 pivoted to one of the end pieces of said carriage 67, the set-screw 142 that fastens said knife in its cutting position and the guide-bar 81 that surmounts the printed paper at its exit from the machine substantially as described.

22. In a combined type-writer and duplicator, the combination of the carriage 12 the carriage 67, the paper roll that surmounts said carriage 67 the pivoted paper cutting knife 140 secured to said carriage; the pulleys 95 and 96, the cord 93 that connects said carriages and runs on said pulleys, the coil spring 89 the cord 90 that connects said duplicator carriage 67 to said spring, the drum 85 that incloses said spring, the pinion 87, the rack-wheel 100 that engages said pinion, the spool 102, the spindle 104 on which said spool is mounted and the wings 106, that project from said spindle and engage in the slots 108, in the hub 107 of said rack-wheel substantially as described.

JOHN T. DAVIS.

In presence of—
 BENJN. A. KNIGHT,
 SAML. KNIGHT.